US011306015B2

(12) United States Patent
Eyster et al.

(10) Patent No.: US 11,306,015 B2
(45) Date of Patent: *Apr. 19, 2022

(54) TREATMENT OF SLUDGES AND FLOCCULANTS USING INSOLUBLE MINERAL COLLOIDAL SUSPENSIONS

(71) Applicant: Heritage Research Group, Indianapolis, IN (US)

(72) Inventors: Perry Eyster, Brownsburg, IN (US); Bynum Henson, Fishers, IN (US); Christopher D. Weber, Greenwood, IN (US)

(73) Assignee: Heritage Research Group, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,052

(22) Filed: Mar. 11, 2020

(65) Prior Publication Data

US 2020/0377390 A1 Dec. 3, 2020

Related U.S. Application Data

(63) Continuation of application No. 15/685,174, filed on Aug. 24, 2017, now Pat. No. 10,626,031.

(60) Provisional application No. 62/399,899, filed on Sep. 26, 2016, provisional application No. 62/379,014, filed on Aug. 24, 2016.

(51) Int. Cl.
| | |
|---|---|
| *C02F 11/143* | (2019.01) |
| *B01D 21/26* | (2006.01) |
| *C02F 1/02* | (2006.01) |
| *C02F 1/38* | (2006.01) |
| *C02F 1/52* | (2006.01) |
| *C02F 11/145* | (2019.01) |
| *C02F 11/148* | (2019.01) |
| *B03D 1/08* | (2006.01) |
| *C02F 11/127* | (2019.01) |
| *C02F 103/36* | (2006.01) |
| *B03D 3/02* | (2006.01) |
| *B03D 3/06* | (2006.01) |

(52) U.S. Cl.
CPC .......... *C02F 11/143* (2019.01); *B01D 21/262* (2013.01); *B03D 1/082* (2013.01); *B03D 1/087* (2013.01); *C02F 1/02* (2013.01); *C02F 1/385* (2013.01); *C02F 1/5245* (2013.01); *C02F 11/145* (2019.01); *C02F 11/148* (2019.01); *B03D 3/02* (2013.01); *B03D 3/06* (2013.01); *C02F 1/5236* (2013.01); *C02F 11/127* (2013.01); *C02F 2103/365* (2013.01)

(58) Field of Classification Search
None
See application file for complete search history.

(56) References Cited

U.S. PATENT DOCUMENTS

| | | |
|---|---|---|
| 4,037,781 A | 7/1977 | High |
| 4,053,401 A | 10/1977 | Fukushima |
| 4,168,228 A | 9/1979 | Mallatt et al. |
| 4,559,143 A | 12/1985 | Asada et al. |
| 4,814,092 A | 3/1989 | Patzelt |
| 4,830,754 A | 5/1989 | Nowak et al. |
| 4,839,022 A | 6/1989 | Skinner |
| 4,852,269 A | 8/1989 | Glorioso |
| 5,098,584 A | 3/1992 | Leen |
| 5,618,442 A | 4/1997 | Christy |
| 5,674,402 A | 10/1997 | Nilsson et al. |
| 5,853,677 A | 12/1998 | Avotins et al. |
| 5,948,269 A | 9/1999 | Stone |
| 5,958,241 A | 9/1999 | DeBenedetto et al. |
| 6,132,630 A | 10/2000 | Briant et al. |
| 2002/0088758 A1 | 7/2002 | Blumenschein et al. |
| 2004/0129175 A1 | 7/2004 | Butters et al. |
| 2005/0016919 A1 | 1/2005 | Hagino et al. |
| 2010/0065497 A1 | 3/2010 | Daines-Martinez et al. |
| 2010/0224577 A1 | 9/2010 | Ball |
| 2011/0089109 A1 | 4/2011 | Ulmert et al. |
| 2012/0152854 A1 | 6/2012 | Remy |
| 2013/0199918 A1* | 8/2013 | Jones .................. C02F 1/44 201/6 |
| 2013/0240442 A1 | 9/2013 | Chidambaran et al. |
| 2013/0256221 A1* | 10/2013 | Reid .................. C02F 1/24 210/620 |

(Continued)

FOREIGN PATENT DOCUMENTS

WO        2003050043 A3      6/2003

OTHER PUBLICATIONS

International Preliminary Report on Patentability and WO from corresponding PCT application No. PCT/US2017/053465 dated Apr. 4, 2019.

(Continued)

*Primary Examiner* — Clare M Perrin

(74) *Attorney, Agent, or Firm* — Woodard, Emhardt, Henry, Reeves & Wagner, LLP

(57) ABSTRACT

A method of separating sludge which involves adding an insoluble mineral colloidal suspension into an industrial sludge to destabilize the industrial sludge and separating destabilized components of the industrial sludge. The insoluble mineral colloidal suspension includes magnesium hydroxide. In an alternative embodiment dry finely divided magnesium hydroxide can be added and then dispersed into an industrial sludge. Conventional flocculants and/or coagulants can also be added. Conventional physical separation processes can be used to separate the destabilized industrial sludge.

14 Claims, No Drawings

(56) References Cited

U.S. PATENT DOCUMENTS

2013/0313199 A1 11/2013 Marcin et al.
2015/0096925 A1 4/2015 Hines et al.

OTHER PUBLICATIONS

FloMag (p. 1, published Jan. 28, 2015). 2015.
Qiao et al. (Journal of Material Sicene, 2008, 7, 2431-2436). Year: 2008.
International Preliminary Report on Patentability and WO from corresponding PCT application No. PCT/US2017/048333 dated Mar. 7, 2019.
International Search Report and Written Opinion from ciorresponding PCT application No. PCT/US2017/048333 dated Dec. 5, 2017.

* cited by examiner

TREATMENT OF SLUDGES AND FLOCCULANTS USING INSOLUBLE MINERAL COLLOIDAL SUSPENSIONS

RELATED APPLICATION

This application is a continuation of U.S. patent application Ser. No. 15/685,174, filed Aug. 24, 2017, which is based upon U.S. Provisional Application Ser. No. 62/379,014, filed Aug. 24, 2016 and U.S. Provisional Application Ser. No. 62/399,899, filed Sep. 26, 2016 to each of which priority is claimed under 35 U.S.C. § 120 and of each of which the entire specification is hereby expressly incorporated by reference.

BACKGROUND

The present invention relates generally to separating sludges and more particularly to the use of insoluble magnesium hydroxide colloidal suspensions that can be added to sludges and/or floats to aid in separation.

The wastewater produced from different kinds of industries normally contains very fine suspended solids, dissolved solids, inorganic and organic particles, metals and other impurities. Due to very small size of the particles and presence of surface charge, the task to bring these particles closer to make heavier mass for settling and filtration becomes challenging.

Petroleum refining generates large volumes of oily wastewater. With industrial development, there is increase in the amount of oil used. Oil refining, oil storage, transportation and petrochemical industries in the production process generate a lot of oily wastewater.

Separating sludge increases recycled content, reduces the overall volume of waste generated as well as increases the outlets available for disposal. Industrial wastewater sludges are often difficult to separate due to relative density of the components as well as particle size and charge distribution. For example, refinery sludge becomes increasingly difficult to process as the inorganic content of the crude slate increases. Various processes throughout refineries increase both the organic content in the form of polymer flocculants and the inorganic content captured by the flocculants.

The low density of particulates in sludge combined with the low density of the accumulated spent flocculants and the increased density of the water component, with high dissolved solids, results in poor separation.

Various traditional and advanced technologies have been utilized to remove the colloidal particles from wastewater; such as ion exchange, membrane filtration, precipitation, flotation, solvent extraction, adsorption, coagulation, flocculation, biological and electrolytic methods.

Traditional approaches include the addition of bentonite, lime, ferric compounds, or varying combinations of expensive coagulants and flocculants. These are often ineffective or require significant dosing rates.

Petroleum refiners use Dissolved Nitrogen Floatation (DNF) units for clarifying wastewater from a variety of refining processes that include washing from a desalter and other wastewater generated processes within a refinery.

DNF units force nitrogen under pressure in the form of microscopic bubbles often with a coagulant additive to float particulate matter that has densities near that of water to the top of the unit where they are skimmed off. Solids that are higher in density sink to the bottom where they are collected separately. The middle phase which is absent of solids is sent to wastewater treatment for processing before discharge.

The DNF bottom sludge and top float are often combined for further treatment. According to one aspect the present invention relates to processing of the combined DNF sludge and float.

Coagulation is the destabilization of colloidal particles brought about by the addition of a chemical reagent known as a coagulant. Flocculation is the agglomeration of destabilized particles into microfloc, and later into bulky flocculent which can be settled called floc.

Coagulation is the process by which colloidal particles and very fine solid suspensions initially present in a wastewater stream are combined into larger agglomerates that can be separated by means of sedimentation, flocculation, filtration, centrifugation, or other separatory methods. This involves a chemical process in which destabilization of non-settleable particles is realized. These non-settleable particles can include most colloids as well as extremely small solid particles and all solvated (dissolved) particles. These particles form clumps with the help of a coagulant. Coagulation is commonly achieved by adding different types of chemicals (coagulants) to a wastewater stream to promote destabilization of any colloid dispersion present and the agglomeration of the individual resultant colloidal particles. Coagulation is the destabilization of these colloids by neutralizing the electrostatic forces that keep them apart. Cationic coagulants provide positive electrostatic charges to reduce the negative electrostatic charges (zeta potential) of the colloids. As a result, these particles collide to form these larger floc particles.

Flocculation refers to the coming together of particles by means of a physical or mechanical process resulting in the joining together of large aggregated clumps (or flocs) to form larger masses and eventually to precipitate them from the liquid phase and thereby convert them into the solid phase for further separation. In coagulation, these forces responsible for keeping the particles suspended and dispersed after they contact each other are reduced. This is usually referred to as collapsing the colloid and/or precipitate formation in the case of solvated particles. Flocculation joins these de-established colloidal dispersions into large aggregates that enter the solid phase.

According to the present invention the addition of insoluble mineral colloidal suspensions in DNF sludges and floats is used to destabilize DNF sludge and/or float wastes for purposes of separation and component recovery. Further, these materials have improved separation in DNF, Dissolved Air Flotation (DAF), and American Petroleum Institute Separator (API Separator), and tank clean-out sludges.

BRIEF SUMMARY

According to various features, characteristics and embodiments of the present invention which will become apparent as the description thereof proceeds, the present invention provides a method of separating sludges which comprises:

obtaining an industrial sludge;

adding an insoluble magnesium hydroxide colloidal suspension into the industrial sludge to destabilize the industrial sludge; and separating destabilized components of the industrial sludge.

The present invention further provides an improvement in processes for physically separating components of a sludge which improvement comprises adding insoluble magnesium hydroxide colloidal suspension into the sludge prior to physically separating components of the sludge.

DETAILED DESCRIPTION OF THE DRAWINGS AND THE PRESENTLY PREFERRED EMBODIMENTS

The present invention relates generally to separating sludges and more particularly to the addition of insoluble magnesium hydroxide colloidal suspensions to DNF, DAF, and API sludges, and other sludge wastes for purposes of separation and component recovery.

The insoluble colloidal magnesium hydroxide suspension used in the present invention can be obtained from mined sources or formed by precipitation and added as a colloidal suspension to sludges and/or floats. Those familiar with the art will understand the benefits of using these materials to destabilize various types of sludge including DNF, DAF, API, and other sludge and/or float wastes.

According to one aspect the present invention involves the introduction of magnesium hydroxide to process sludges which acts to inhibit the effect of accumulated spent flocculent and increase the density of new flocculent such that traditional processing equipment can be used to more effectively process sludges.

The use of magnesium hydroxide allows the introduction and/or formation of stable and pumpable, high concentration suspensions without detrimentally altering pH or significantly increasing total solids content. The low solubility results in a diffuse solids component with suitable charge that adds density to the floc and allows for easy settling or centrifugation from the water and oil components of the sludges.

Adding an insoluble colloidal magnesium hydroxide suspension into an industrial sludge according to the present invention causes colloidal particles and very fine solid suspensions initially present in the industrial sludge to combine into larger agglomerates that can be separated by means of sedimentation, flocculation, filtration, centrifugation, or other separatory methods.

The insoluble colloidal magnesium hydroxide suspensions of the present invention can include mined material suspended in an aqueous solution or precipitated from soluble compounds to yield suspended solids.

The insoluble colloidal mineral suspensions used in the present invention can have as little of 25% percent solids by weight and up to 65% percent solids by weight with about 50-60% solids by weight being generally suitable for purposes of the present invention. In an alternative embodiment to adding an insoluble colloidal mineral suspension to a sludge dry solids of finely divided magnesium hydroxide can be added to the sludge and then dispersed. However this alternative does not afford the ease of addition or certainty of thorough solids distribution.

While the insoluble colloidal magnesium hydroxide suspension used according to the present invention causes colloidal particles and very fine solid suspensions initially present in an industrial sludge to combine into larger agglomerates, it can be understood that the addition of other known coagulants and/or flocculants can also be used to aid and improve agglomeration and clumping for separation purposes According to the present invention exemplary sludges include industrial wastewater sludges in general, refinery sludges and in particular sludges from processes such as DNF, DAF, API separators, and tank clean-out sludges.

For purposes of the present invention conventional flocculants/coagulants can also be used including mineral, natural and synthetic materials as well as those listed above.

EXAMPLES

The following non-limited Examples are provided to illustrate various features and characteristics of the present invention which are not intended to be specifically limited thereto.

Example 1

In this example DNF sludge and float were transferred from a DNF tank to a smaller tank where a 50-60% solids by weight suspension of magnesium hydroxide was added at 1.75% by volume of the DNF sludge and float. A coagulant (water soluble cationic polymer) was added at 500 parts per million to aid in separation. The combined mixture was heated from ambient temperature to 170° F. The heated material was then fed to a three phase centrifuge to separate clean water (centrate), oils and solids. The centrate had the characteristic of having less than 1% particulate solids and could be sent back (recovered and recycled) to the DNF or sent on to wastewater treatment. The oil could be recovered (and recycled) and the solids could be disposed of.

Example 2

In this example the same procedure in Examples 1 above was followed except 200 ppm of water soluble anionic was added to the sludge and float. The combined mixture was heated from ambient temperature to 170° F. The heated material was then fed to a three phase centrifuge to separate clean water (centrate), oils and solids. The centrate had the characteristic of having less than 1% particulate solids and could be sent back (recovered and recycled) to the DNF or sent on to wastewater treatment. The oil could be recovered (and recycled) and the solids could be disposed of.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method of separating sludges which comprises:
    obtaining an industrial sludge, wherein the industrial sludge comprises DNF bottom sludge and top float;
    adding an insoluble magnesium hydroxide colloidal suspension into the industrial sludge to destabilize the industrial sludge; and
    separating destabilized components of the industrial sludge.

2. A method of separating sludges according to claim 1, wherein a flocculant and/or coagulant is added to the industrial sludge to aid in the separation of the destabilized components of the industrial sludge.

3. A method of separating sludges according to claim 1, wherein the industrial sludge is refinery sludge.

4. A method of separating sludges according to claim 1, wherein the insoluble magnesium hydroxide colloidal suspension has a solids percent by weight of at least 25%.

5. A method of separating sludges according to claim 1, wherein the insoluble magnesium hydroxide colloidal suspension has a solids percent of up to 65%.

6. A method of separating sludges according to claim 1, wherein the insoluble magnesium hydroxide colloidal suspension has a solids percent by weight that ranges from 25% to 65%.

7. A method of separating sludges according to claim 1, the method further comprising heating the combined mixture comprising industrial sludge and insoluble magnesium hydroxide colloidal suspension to 170° F. from ambient temperature.

8. A process for physically separating components of an industrial sludge, wherein the industrial sludge comprises DNF bottom sludge and top float, the improvement comprising adding an insoluble mineral colloidal suspension into the sludge prior to physically separating components of the sludge.

9. A process for physically separating components of an industrial sludge according to claim 8, wherein the process for physically separating the components of the sludge includes at least one of gas-assisted flotation, gravity separation and centrifugal separation.

10. A process for physically separating components of an industrial sludge according to claim 8, wherein the process for physically separating the components of the sludge comprises one of dissolved nitrogen floatation and dissolved air flotation.

11. A process for physically separating components of an industrial sludge according to claim 8, wherein the process for physically separating the components of the sludge comprises the use of an American Petroleum Institute Separator.

12. A process for physically separating components of an industrial sludge according to claim 8, wherein the insoluble mineral colloidal suspension has a solids percent by weight of at least 25%.

13. A process for physically separating components of an industrial sludge according to claim 8, wherein the insoluble mineral colloidal suspension has a solids percent of up to 65%.

14. A process for physically separating components of an industrial sludge according to claim 8, wherein the insoluble mineral colloidal suspension has a solids percent that ranges from 25% to 65%.

* * * * *